(12) United States Patent
Syrjarinne (10) Patent No.: US 11,294,064 B2
(45) Date of Patent: Apr. 5, 2022

(54) PROVIDING AND USING ASSISTANCE DATA INCLUDING IONOSPHERE MODELS

(71) Applicant: HERE Global B.V., Eindhoven (NL)

(72) Inventor: Jari Syrjarinne, Tampere (FI)

(73) Assignee: HERE Global B.V., Eindhoven (NL)

( * ) Notice: Subject to any disclaimer, the term of this patent is extended or adjusted under 35 U.S.C. 154(b) by 0 days.

(21) Appl. No.: 17/017,884

(22) Filed: Sep. 11, 2020

(65) Prior Publication Data

US 2020/0408920 A1 Dec. 31, 2020

Related U.S. Application Data

(62) Division of application No. 15/506,123, filed as application No. PCT/EP2015/069822 on Aug. 31, 2015, now Pat. No. 10,802,151.

(60) Provisional application No. 62/045,058, filed on Sep. 3, 2014.

(51) Int. Cl.
*G01S 19/07* (2010.01)
*G01S 19/13* (2010.01)

(52) U.S. Cl.
CPC .......... *G01S 19/072* (2019.08); *G01S 19/071* (2019.08); *G01S 19/13* (2013.01)

(58) Field of Classification Search
CPC ...... G01S 19/07; G01S 19/071; G01S 19/072; G01S 19/13
See application file for complete search history.

(56) References Cited

U.S. PATENT DOCUMENTS

| 6,356,232 | B1 | 3/2002 | Rocken et al. |
| 2011/0039576 | A1* | 2/2011 | Prakash ............... H04W 64/00 455/456.1 |
| 2012/0050097 | A1 | 3/2012 | Zhang et al. |
| 2013/0021201 | A1 | 1/2013 | del Castillo et al. |
| 2014/0002299 | A1 | 1/2014 | Leandro et al. |

OTHER PUBLICATIONS

"BeiDou Navigation Satellite System Signal in Space Interface Control Document-Open Service Signal B1I", Version 1.0. China Satellite Navigation Office—Publication date: Dec. 27, 2012.
"BeiDou Navigation Satellite System Signal in Space Interface Control Document-Open Service Signal", Version 2.0. China Satellite Navigation Office—Publication date: Dec. 27, 2013.
Wabuchi, Tetsuya, et al. "Deformation Monitoring with Single Frequency L1 Receivers." Proceedings of the 21st International Technical Meeting of the Satellite Division of the Institute of Navigation (ION GNSS 2008), Savannah, GA, 2008.

(Continued)

*Primary Examiner* — Dao L Phan
(74) *Attorney, Agent, or Firm* — Lempia Summerfield Katz LLC (57) ABSTRACT

A first apparatus assembles assistance data for a satellite signal based positioning of a device, the assistance data comprising a satellite specific ionospheric model for at least one specific satellite and a time stamp that relates the satellite specific ionospheric model to particular ephemeris data for the at least one specific satellite. The assistance data is provided for transmission. A second apparatus receives the assistance data and computes a position of the device making use of the particular ephemeris data and of the satellite specific ionospheric model.

8 Claims, 7 Drawing Sheets

(56) References Cited

OTHER PUBLICATIONS

Kubrak, Damien, et al. "Vehicular navigation using a tight integration of aided-GPS and low-cost MEMS sensors" ION NTM 2006, National Technical Meeting of The Institute of Navigation. 2006.
PCT International Search Report and Written Opinion of the International Searching Authority dated Nov. 30, 2015 for corresponding PCT/EP2015/069822.
Rocken, Christian, et al. "Real-time ionospheric and atmospheric corrections for wide area single frequency carrier phase ambiguity resolution." Proc. ION-GNSS 19th Intl. Technical Meeting of the Satellite Division, Inst. of Navigation, Fort Worth, Texas. Vol. 12081218. 2006.
Search Report and Written Opinion cited in PCT/EP2015/069822, dated Aug. 31, 2015.
Technical specification 3GPP TS 36.355 V12.2.0: "3rd Generation Partnership Project; Technical Specification Group Radio Access Network; Evolved Universal Terrestrial Radio Access (E-UTRA); LTE Positioning Protocol (LPP) (Release 12)" 3GPP. Publication date: Jun. 2014.

\* cited by examiner

PROVIDING AND USING ASSISTANCE DATA INCLUDING IONOSPHERE MODELS

This application is a divisional under 35 U.S.C § 121 and 37 C.F.R. § 1.53(b) of U.S. patent application Ser. No. 15/506,123, filed on Feb. 23, 2017, which is filed under 35 U.S.C. 371 claiming benefit of PCT Application No. PCT/EP2015/069822, filed on Aug. 31, 2015, which claims the benefit of U.S. 62/045,058, filed on Sep. 3, 2014, the contents of each of which are incorporated herein by reference.

FIELD OF THE DISCLOSURE

The invention relates to the field of satellite signal based positioning and more specifically to an assisted satellite signal based positioning, where the assistance data includes ionosphere models.

BACKGROUND

A position of a device can be determined by means of various positioning methods. A positioning of devices is supported for instance by various Global Navigation Satellite Systems (GNSS). These include for example the American Global Positioning System (GPS), the Russian Global Navigation Satellite System (GLONASS), the future European system Galileo, the Space Based Augmentation Systems (SBAS), the Japanese GPS augmentation Quasi-Zenith Satellite System (QZSS), the Locals Area Augmentation Systems (LAAS), and hybrid systems.

It is the general idea of GNSS positioning to receive satellite signals of a number of satellites at a receiver which is to be positioned, to measure the pseudorange between the receiver and a respective satellite and further the current position of the receiver, making use in addition of estimated positions of the satellites. The positions of the satellites may be estimated based on orbit models in navigation messages that are included in the satellite signals.

A satellite signal is distorted on its way from a satellite to a receiver due to, for instance, influences by ionosphere. A ionospheric model may include parameters modeling the propagation delay of GNSS signals through the ionosphere. Knowledge about such a model enables a receiver in addition to remove parts of the ionospheric delay from pseudorange measurements. Examples of the ionospheric models include the Klobuchar model and the NeQuick model.

In some environments, a GNSS receiver may be able to acquire and track sufficient satellite signals for a positioning, but the quality of the signals may not be sufficiently high for decoding the navigation messages. This may be the case, for instance, in indoor environments. Further, the decoding of navigation messages requires a significant amount of processing power, which may be limited in a mobile GNSS receiver. Furthermore, while the GNSS satellites may transmit ionosphere models for correcting the signals accordingly, the provided models may be not very accurate or up-to-date. If the GNSS receiver is included in a wireless communication terminal or attached as an accessory device to a wireless communication terminal, a wireless access network may be able to provide the wireless communication terminal via a radio link with assistance data. The assistance data may be provided for instance by a location server. Assistance data is typically provided for each satellite that is visible to the GNSS receiver associated with the cellular terminal. The assistance data may comprise navigation message parameters, which usually include orbit models in the form of ephemeris data, time of ephemeris (TOE) and time of clock (TOC) parameters and satellite identity parameters. Further, correction data which take account, for example, of GNSS signal delays caused by the ionosphere, may be provided as assistance data. Such a supported GNSS based positioning is referred to as assisted GNSS (A-GNSS). The received information may enable the GNSS receiver or the associated wireless communication terminal to obtain a position fix in a shorter time, in more challenging signal conditions, more accurately and/or with reduced power consumption one of the most important A-GNSS use cases is emergency call positioning, which needs to be as reliable, fast and available as possible.

Assistance data for various assisted navigation systems have been specified and standardized for various cellular systems.

SUMMARY OF SOME EMBODIMENTS OF THE INVENTION

For a first aspect, an example embodiment of a method comprises, performed by at least one apparatus, assembling assistance data for a satellite signal based positioning of a device, the assistance data comprising a satellite specific ionospheric model for at least one specific satellite and a time stamp that relates the satellite specific ionospheric model to particular ephemeris data for the at least one specific satellite. The method further comprises providing the assistance data for transmission.

For a second aspect, an example embodiment of a method comprises, performed by at least one apparatus, receiving assistance data for a satellite signal based positioning of a device, the assistance data comprising a satellite specific ionospheric model for at least one satellite and a time stamp that relates the satellite specific ionospheric model to particular ephemeris data for the at least one specific satellite. This method further comprises computing a position of the device making use of the particular ephemeris data and of the satellite specific ionospheric model.

For the first aspect, an example embodiment of a first apparatus comprises means for performing the actions of the example method presented for the first aspect.

For the second aspect, an example embodiment of a first apparatus comprises means for performing the actions of the example method presented for the second aspect.

The means of the first apparatus presented for the first aspect as well as the means of the first apparatus presented for the second aspect can be implemented in hardware and/or software. They may comprise for instance a processor for executing computer program code for realizing the required functions, a memory storing the program code, or both. Alternatively, they could comprise for instance a circuit that is designed to realize the required functions, for instance implemented in a chipset or a chip, like an integrated circuit.

For the first aspect, moreover an example embodiment of a second apparatus is presented, which comprises at least one processor and at least one memory including computer program code, the at least one memory, and the computer program code configured to cause the processor at least to perform the actions of the example method presented for the first aspect.

For the second aspect, moreover an example embodiment of a second apparatus is presented, which comprises at least one processor and at least one memory including computer program code, the at least one memory and the computer program code configured to cause the processor at least to perform the actions of the example method presented for the second aspect.

Any of the described apparatuses may comprise only the indicated components or one or more additional components.

For the first aspect, moreover an example embodiment of a non-transitory computer readable storage medium is presented, in which computer program code is stored. The computer program code causes an apparatus to perform the actions of the example method presented for the first aspect when executed by a processor.

For the second aspect, moreover an example embodiment of a non-transitory computer readable storage medium is presented, in which computer program code is stored. The computer program code causes an apparatus to perform the actions of the example method presented for the second aspect when executed by a processor.

For both aspects, the computer readable storage medium could be for example a disk or a memory or the like. The computer program code could be stored in the computer readable storage medium in the form of instructions encoding the computer-readable storage medium. The computer readable storage medium may be intended for taking part in the operation of a device, like an internal or external hard disk of a computer, or be intended for distribution of the program code, like an optical disc.

It is to be understood that also the respective computer program code by itself has to be considered an embodiment of the invention. The computer program code could also be distributed to several computer readable storage mediums for each aspect.

In one embodiment, any of the presented methods is an formation providing method, and any of the presented first apparatuses is an information providing apparatus. In one embodiment, the means of the presented first apparatus of the first aspect or the means of the presented first apparatus of the second aspect are processing means.

In certain embodiments of the methods presented for the first aspect, the methods are methods for providing assistance data for a satellite signal based positioning. In certain embodiments of the apparatuses presented for the first aspect, the apparatuses are apparatuses for providing assistance data for a satellite signal based positioning.

In certain embodiments of the methods presented for the second aspect, the methods are methods for using assistance data for a satellite signal based positioning. In certain embodiments of the apparatuses presented for the second aspect, the apparatuses are apparatuses for using assistance data fora satellite signal based positioning.

It is to be understood that any feature presented for a particular exemplary embodiment may also be used in combination with any other described exemplary embodiment of any category.

Further, it is to be understood that the presentation of the invention in this section is merely exemplary and non-limiting.

Other features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not drawn to scale and that they are merely intended to conceptually illustrate the structures and procedures described herein.

DETAILED DESCRIPTION OF THE FIGURES

Figure 1:
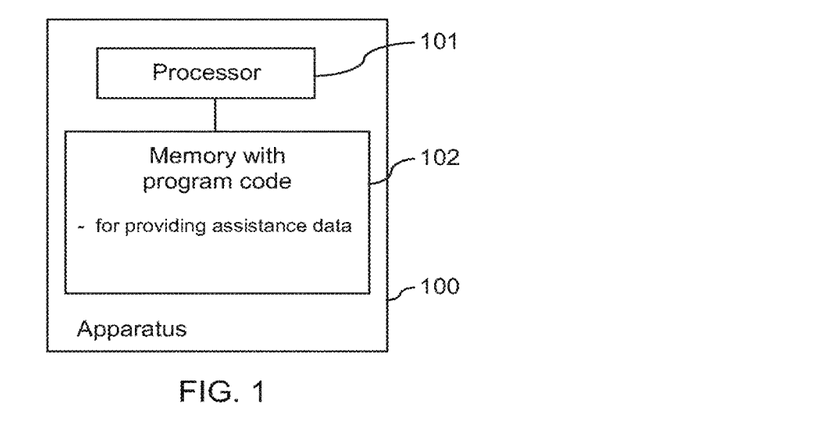
FIG. 1 is a schematic block diagram of an example embodiment of an apparatus according to aspect.

FIG. 1 is a schematic block diagram of an example embodiment of an apparatus 100 of the first aspect. Apparatus 100 comprises a processor 101 and, linked to processor 101, a memory 102. Memory 102 stores computer program code for providing assistance data for a satellite signal based positioning. Processor 101 is configured to execute computer program code stored in memory 102 in order to cause an apparatus to perform desired actions.

Apparatus 100 could be a server, for instance a dedicated location server, or any other device. Apparatus 100 could equally be a module, like a chip, circuitry on a chip or a plug-in board, for a device. Optionally, apparatus 100 could comprise various other components, like a data interface, a user interface, a further memory, a further processor, etc.

An operation of apparatus 100 will now be described with reference to the flow chart of FIG. 2. The operation is an example embodiment of a method according to the second aspect. Processor 101 and the program code stored in memory 102 cause an apparatus to perform the operation when the program code is retrieved from memory 102 and executed by processor 101. The apparatus that is caused to perform the operation can be apparatus 100 or some other apparatus, for example but not necessarily a device comprising apparatus 100.

The apparatus assembles assistance data for a satellite signal based positioning of a device. The assistance data comprises a satellite specific ionospheric model for at least one specific satellite and a time stamp that relates the satellite specific ionospheric model to particular ephemeris data for the at least one specific satellite. (action 201) The ephemeris data defines an orbit model for the at least one specific satellite.

The apparatus furthermore provides the assistance data for transmission. (action 202)

Figure 3:
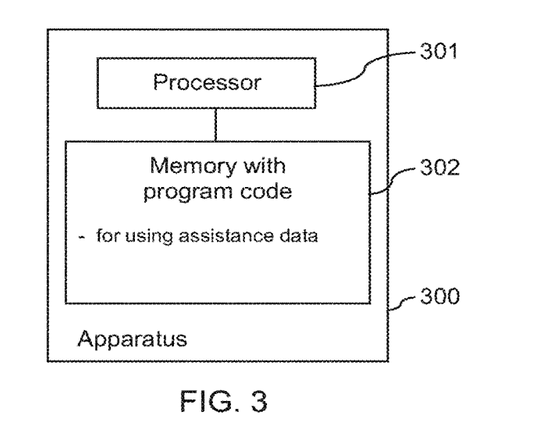
FIG. 3 is a schematic block diagram of an example embodiment of an apparatus according to the second aspect.

FIG. 3 is a schematic block diagram of an example embodiment of an apparatus 300 of the first aspect. Apparatus 300 comprises a processor 301 and, linked to processor 301, a memory 302. Memory 302 stores computer program code for using assistance data for a satellite signal based positioning. Processor 301 is configured to execute computer program code stored in memory 302 in order to cause an apparatus to perform desired actions.

Apparatus 300 could be a mobile device, like a mobile communication device. Apparatus 300 could equally be a module, like a chip, circuitry on a chip or a plug-in board, for a device. Optionally, apparatus 300 could comprise various other components, like a data interface, a user interface, a further memory, a further processor, etc.

An operation of apparatus 300 will now be described with reference to the flow chart of FIG. 4. The operation is an example embodiment of a method according to the second aspect. Processor 301 and the program code stored in memory 302 cause an apparatus to perform the operation when the program code is retrieved from memory 302 and executed by processor 301. The apparatus that is caused to perform the operation can be apparatus 300 or some other apparatus, for example but not necessarily a device comprising apparatus 300.

The apparatus receives assistance data for a satellite signal based positioning of a device. The assistance data comprises a satellite specific ionospheric model for at least one satellite and a time stamp that relates the satellite specific ionospheric model to particular ephemeris data for the at least one specific satellite. (action 401)

The apparatus furthermore computes a position of the device making use of the particular ephemeris data and of the satellite specific ionospheric model. (action 402)

Current mobile communication standards supporting an assisted satellite signal based positioning provide a common and global ionospheric model that is designed to be used for all satellites of any GNSS. Such a general approach may not be suited for all use cases.

Certain embodiments of the invention therefore provide for the first aspect that a satellite specific ionospheric model is provided as assistance data instead along with a time stamp. The time stamp can be based for instance on satellite system time. It could be for instance a time of ephemeris (toe) parameter.

Certain embodiments of the invention provide for the second aspect that an apparatus receives such a satellite specific ionospheric model and uses the satellite specific ionospheric model for positioning computations. That is, the ionospheric model for a specific satellite may be used for instance for correcting the propagation delay of signal received from this specific satellite.

Certain embodiments of the invention may thus have the effect that satellite specific ionosphere models may be used if preferred for some reason. The time stamp may have the effect that satellite specific ionospheric model may be aligned with corresponding ephemeris data. This ensures that the orbit model can be selected from the same epoch as the ionospheric model. It is to be understood that the time stamp may align the ionospheric model as well with other time specific data, like a clock model that may be available for the specific satellite.

Figure 2:
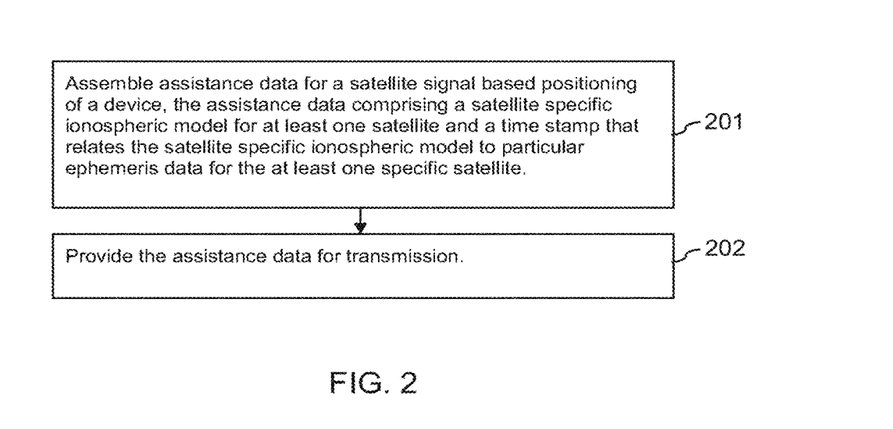
FIG. 2 is a flow chart illustrating an example embodiment of a method according to the first aspect.
Figure 4:
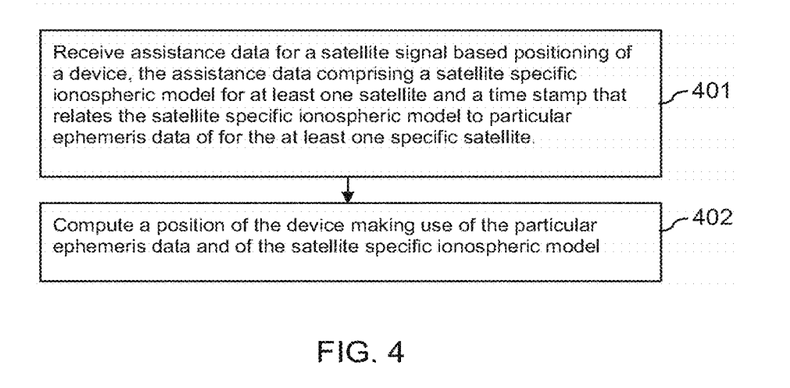
FIG. 4 is a flow chart illustrating an example embodiment of a method according to the second aspect.

Apparatus 100 illustrated in FIG. 1 and the method illustrated in FIG. 2 as well as apparatus 300 illustrated in FIG. 3 and the method illustrated in FIG. 4 may be implemented and refined in various ways.

In an example embodiment, the at least one specific satellite is a satellite of the BeiDou navigation satellite system.

The A-GNSS specifications of current cellular standards support GPS, GLONASS, Galileo, QZSS and SBAS satellite systems. The newest addition to the standards has been the Chinese satellite positioning system BeiDou (BDS). Details of BDS are described for instance in the document "BeiDou Navigation Satellite System, Signal in Space, Interface Control Document, Open Service Signal B1I (Version 1.0)" of the China Satellite Navigation Office of December 2012. BDS is very similar to the other mentioned GNSS, but some differences exist in the data formats and data protocol. For example, the BDS specification indicates that ephemeris parameters and ionosphere model parameters are transmitted at the same time in the same data, element as parts of "Fundamental NAV information of the broadcasting satellite" data with an update rate of one hour. This means that the system is designed to broadcast satellite specific ionospheric models.

Assistance data including BDS-satellite specific ionosphere models in accordance with certain embodiments of the invention could thus assist in supporting full compatibility and maximum positioning performance of an A-GNSS based positioning of a device using received BDS-satellite signals. For example, a device with a BDS receiver may be enabled to process received assistance data for BDS satellite signals in the same manner as received BDS satellite signals.

In a first example approach, the ionospheric model may be included in an information element of a message, the information element including a satellite identifier identifying the specific satellite. Such a satellite identifier may have the effect that it allows linking a ionospheric model unambiguously to the corresponding satellite. The ephemeris data may then be included for example in a further information element of the message, the further information element being different from the information element including the ionospoheric model, and the further information element including as well a satellite identifier identifying the same specific satellite. The satellite identifier may help in associating the satellite specific ionospheric model with the correct satellite and thus with the ephemeris data of the correct satellite.

The satellite specific ionospheric model could be provided as a part of generic assistance data that is provided for one or more GNSSs. With the first approach such generic assistance data could include on the one hand a navigation model information element for each GNSS with the ephemeris data for various satellites and on the other hand a ionospheric model information element. The navigation model information element could include in addition to the ephemeris data as orbit model some other data too, for instance a clock model. The ionospheric model information element could be provided for all GNSSs for which assistance data is provided, but it could also be provided for one or more selected GNSSs only, for instance for BDS only. For all other CNSSs, a receiving device may rely on a ionospheric model that may be provided in common assistance data that may be used for any GNSS.

In a second example approach, the satellite specific ionospheric model for the at least one specific satellite could be included in an information element of a message that is provided for navigation models including an orbit model for the specific satellite, a clock model for the specific satellite and a common satellite identifier identifying the specific satellite for each of the satellite specific ionospheric model, the ephemeris data as orbit model for the specific satellite and the clock model for the specific satellite. With this approach, a separate satellite identifier for each satellite specific ionospheric model would not be needed, as the satellite identifier can be shared for all models.

In an example embodiment, a common ionosphere model is included in addition in the assistance data. A satellite specific ionospheric model and a time stamp that relates the satellite specific ionospheric model to particular ephemeris data for the at least one specific satellite are included in the assistance data only for at least one specific satellite for which a satellite specific ionospheric model is available that is different from the common ionosphere model. This may have the effect that the amount of data provided in the assistance data can be reduced. This may be of particular interest, in the case that the common ionospheric model can be used for the majority of the satellites or at least for a large number of the satellites.

In an example embodiment of the first aspect, the assistance data could be assembled upon request of a device. In an example embodiment of the first aspect, the assistance data could be caused to be transmitted to a device, for instance to a requesting device. In an example embodiment of the first aspect, the assistance data could be transmitted to a device.

In an example embodiment of the second aspect, an apparatus could receive satellite signals, for example by means of at least one included satellite signal receiver supporting reception of signals of satellites of at least one GNSS. In an example embodiment of the second aspect, the apparatus could receive satellite signal measurements, for instance from at least one satellite signal receiver supporting reception of signals of satellites of at least one GNSS.

In an example embodiment of the second aspect, an apparatus could assemble a request for the assistance data. In an example embodiment of the second aspect, the apparatus could assemble a request for the assistance data, the request including a request for assistance data for a BeiDou navigation satellite system and a request for satellite specific ionospheric models for BeiDou navigation satellite system satellites. In an example embodiment of the second aspect, the apparatus could assemble a request for the assistance data, the request including a request for a satellite specific ionospheric model for at least one specific satellite. In an example embodiment of the second aspect, the apparatus could assemble a request for the assistance data, the request including at least one time stamp for available ephemeris data for at least one specific satellite. In an example embodiment of the second aspect, the apparatus could cause transmission of a request for the assistance data to a server. In an example embodiment of the second aspect, the apparatus could transmit a request for the assistance data to a server.

Providing assistance data upon request may have the effect that the assistance data is only provided when needed. Including in a request an indication of the desired information may have the effect that exactly the required assistance data is provided.

In an example embodiment of the second aspect, an apparatus could assemble a message with data, informing a server about assistance data types supported by the device, the message including information that the device supports the use of satellite specific ionospheric models of a particular global navigation satellite system, and cause transmission of the message to a server. Informing a server about the capabilities of a device may have the effect that a server may generally provide exactly the assistance data that is needed and/or that can be processed at the device. As a result, it may not be required to repeat details that do not change each time that assistance data is requested from the server.

Figure 5:
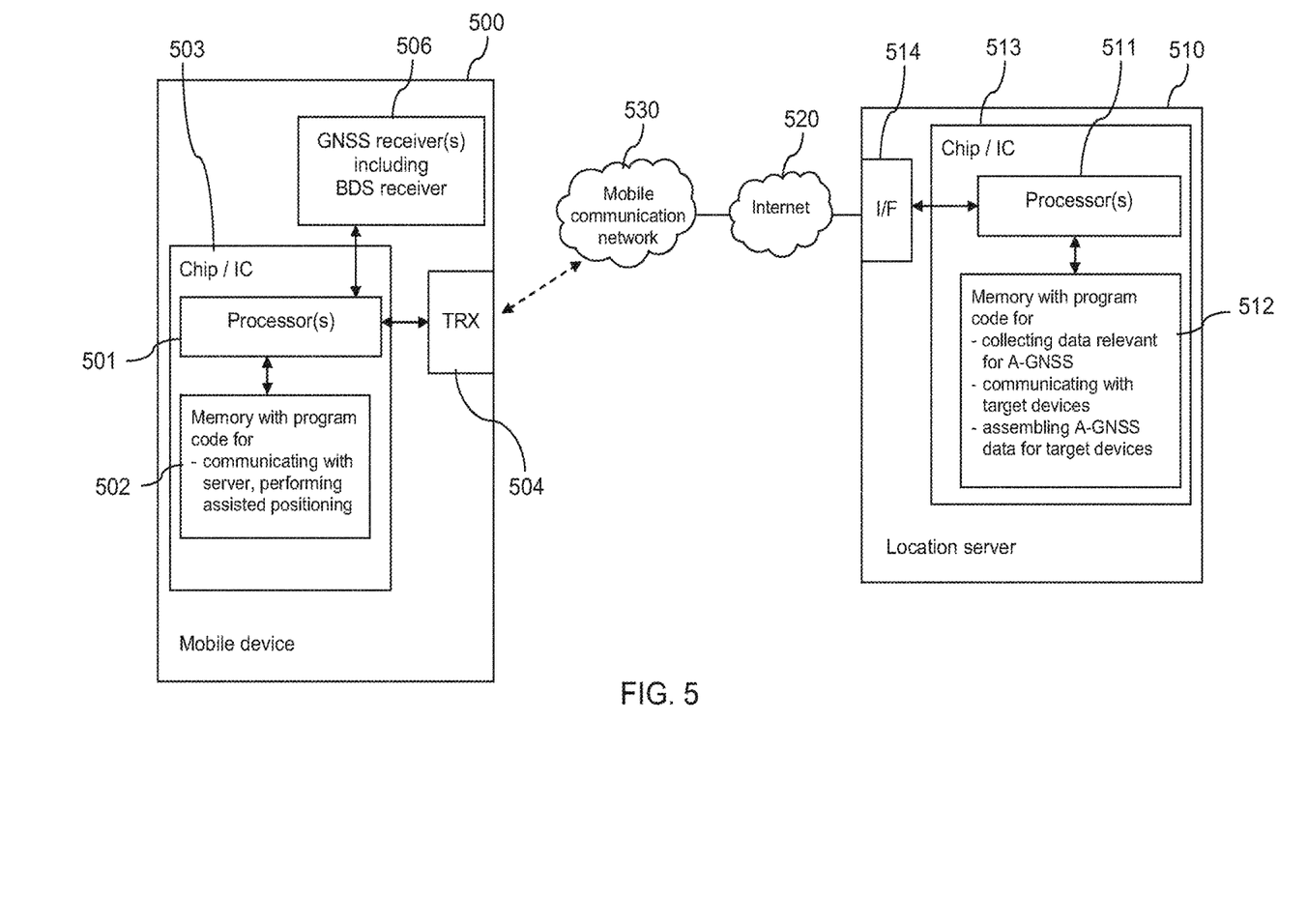
FIG. 5 is a schematic block diagram of an example embodiment of a system.

FIG. 5 is a schematic block diagram of an example embodiment of a system according to the invention. The system may support A-GNSS for various GNSSs.

The system comprises a mobile device 500 and a location server 510. The system further comprises a network 520, by way of example the Internet. The system further comprises a mobile communication network 530 that is connected to the Internet 520.

Mobile device 500 may be for instance a mobile telephone, like a smartphone, a tablet PC, a laptop or any other mobile device with communication capabilities. Mobile device 500 is also referred to as target device. It comprises a processor 501 that is linked to a memory 502, to at least one transceiver 504, and to at least one GNSS receiver 506. Processor 501 is configured to execute computer program code, including computer program code stored in memory 502, in order to cause mobile device 500 to perform desired actions.

Memory 502 stores computer program code for determining a position of mobile device 500 using an assisted satellite based positioning and for communicating to this end with location server 510. The computer program code may comprise for example similar program code as memory 302. In addition, memory 502 could store computer program code configured to realize other functions as well as any other kind of data.

Processor 501 and memory 502 may optionally belong to a chip or an integrated circuit 503, which may comprise in addition various other components, for instance a further processor or memory.

Transceiver 504 is a component which enables mobile device 500 to communicate with other devices, like server 510, via at least one kind of radio communication nodes, for instance a base station of a mobile communication network or a wireless local area (WLAN) access point.

The at least one GNSS receiver 506 is configured to receive at least BDS satellite signals. The at least one GNSS receiver 506 could be a single GNSS receiver that is configured to receive BDS satellite signals only, or a single GNSS receiver that is configured to receive satellite signals of different GNSSs, for instance BDS satellite signals, GPS satellite signals, Galileo satellite signals and GLONASS satellite signals. Alternatively, the at least one GNSS receiver 506 could comprise two or more GNSS receivers, including a BDS receiver and at least one other type of GNSS receiver, like a GPS receiver.

Component 503 or mobile device 500 could be an example embodiment of an apparatus according to the second aspect of the invention.

Server 510 may be for instance a dedicated location server, or some other kind of server including corresponding positioning support functionality. Server 510 comprises a processor 511 that is linked to a memory 512 and to an interface (I/F) 514. Processor 511 is configured to execute computer program code, including computer program code stored in memory 512, in order to cause server 510 to perform desired actions.

Memory 512 stores computer program code for communicating with mobile devices and for assembling assistance data for a satellite signal based positioning. It may comprise similar program code as memory 102. Optionally, the computer program code may comprise program code for collecting data as a basis for the assistance data. In addition, memory 512 could store computer program code configured to realize other functions. In addition, memory 512 could also store other kind of data.

Processor 511 and memory 512 may optionally belong to a chip or an integrated circuit 513, which may comprise in addition various other components, for instance a further processor or memory. A further memory (not shown) of component 513 or external to component 513 could store for instance data on the capabilities of mobile devices, or data forming the basis for assistance data that is to be assembled upon requests of mobile devices.

Interface 514 is a component which enables server 510 to communicate with other devices, like mobile device 500, via network 520. It could also enable server 510 to communicate with entities (not shown) providing data forming the basis for assistance data, like stationary GNSS receivers. Interface 514 could comprise for instance a TCP/IP socket.

Component 513 or server 510 could be an example embodiment of an apparatus according to first aspect of the invention.

Example operations in the system of FIG. 5 will now be described with reference to FIGS. 6 and 7.

Figure 6:
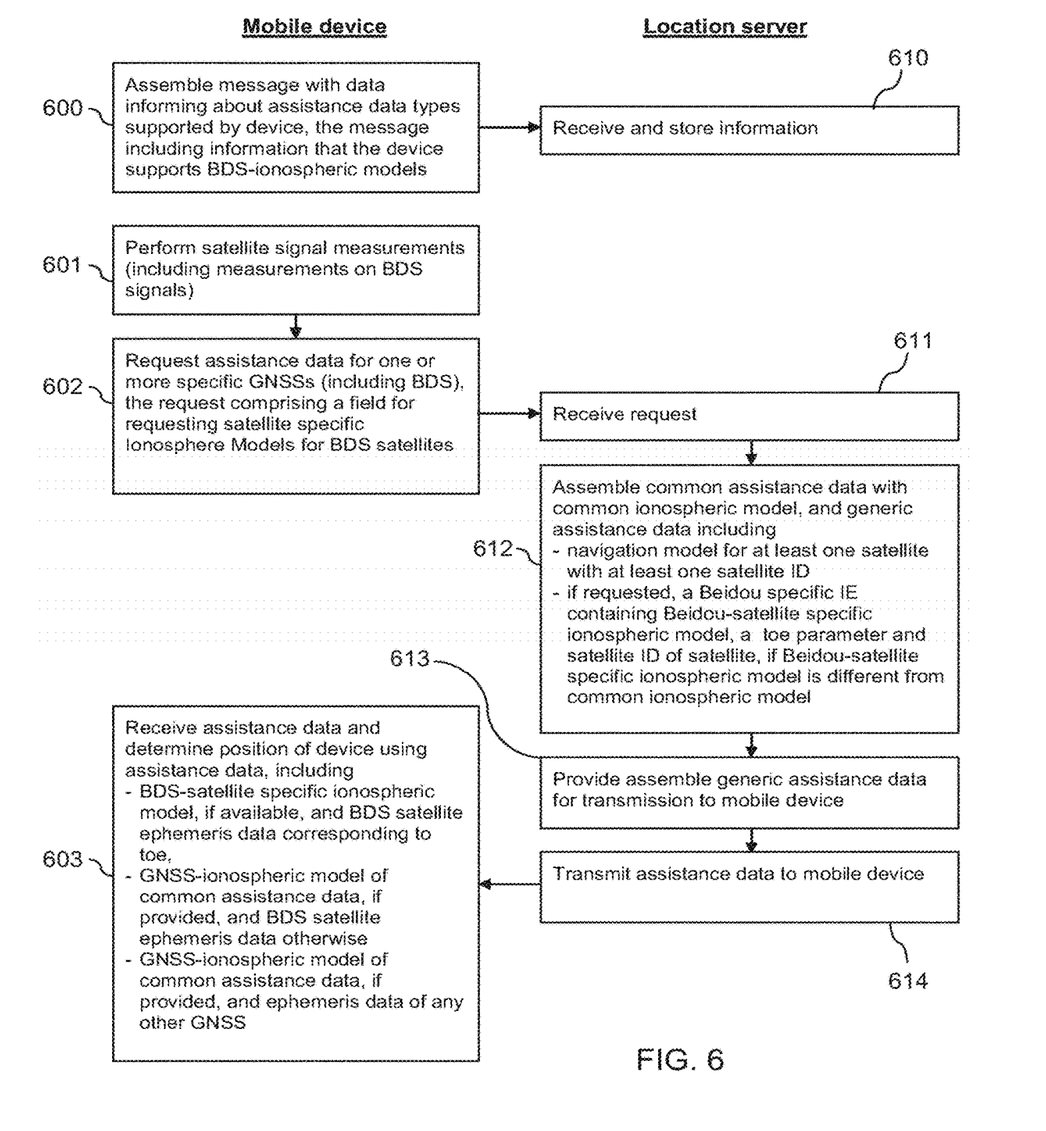
FIG. 6 is a flow chart illustrating a first example embodiment of an operation in the system of FIG. 5.

FIG. 6 is a flow chart illustrating example operations resulting with a first example implementation for supporting the use of BDS-satellite specific ionospheric models in assistance data.

Processor 501 and some of the program code stored in memory 502 causes mobile device 500 to perform the actions presented on the left hand side when the program code is retrieved from memory 502 and executed by processor 501. Processor 511 and some of the program code stored in memory 512 causes server 510 to perform the actions presented on the right hand side when the program code is retrieved from memory 512 and executed by processor 511.

Mobile device 500 assembles a message with data on supported GNSS generic assistance data types for each supported GNSS. The message includes information that the device supports BDS-satellite specific ionospheric models. (action 600) The information may be included in a dedicated field "BDS-IonoModSup" that is defined for an information element (IE) "GNSS-GenericAssistanceDataSupport" as one of several GNSS capability information elements. The field may be mandatorily present if a target device supports BDS-ionospheric models; otherwise it may not be present. The field may only be allowed to be present if a relevant GNSS identifier (GNSS ID) in the IE "GNSS-GenericAssistanceDataSupport" indicates the GNSS, for which the respective data is provided, to be BDS.

Location server 510 receives the message and may store the information for future use. (action 610)

When position of mobile device 500 is to be determined, for instance in response to a user request or upon initiation of some application running in mobile device 500, mobile device 500 performs satellite signal measurements using GNSS receiver 506, including measurements on BDS satellite signals. (action 601)

In addition, mobile device 500 requests assistance data for one or more GNSSs, including BDS, from server 510. The assistance data may be requested on a general basis, or only in case a stand-alone positioning based on the received satellite signals turns out to be difficult or impossible. (action 602)

The specific GNSS for which the assistance data is requested may be indicated by an IE "GNSS-ID" and possibly an IE "SBAS-ID" in an IE "GNSS-GenericAssistDataReq" of a GNSS assistance data request. The request may comprise in this "GNSS-GenericAssistDataReq" IE a field "BDS-IonoModReq" for requesting satellite specific ionosphere models for BDS satellites. The field may be mandatorily present if a target device requests BDS-inonspheric models; otherwise it may not be present. The field may only be allowed to be present if a relevant GNSS identifier (GNSS ID) in the IE "GNSS-GenericAssistanceDataRequest" indicates the GNSS, for which the respective data is provided, to be BDS.

In case mobile device 500 indicated in action 600 that it supports the use of BDS-ionospheric models, including a separate request for BDS-ionospheric models in the request of action 601 may not be required, since corresponding information may already be stored at server 510.

Server 510 receives the request. (action 611)

Server 510 assembles thereupon GNSS assistance data, including common assistance data including an IE "GNSS-IonosphereModel" as a common ionosphere model, and generic assistance data for a respective specific GNSS. (action 612) The data for a respective specific GNSS, identified by an IE "GNSS-ID", may include different kinds of information elements, for instance an information element for time models, an information element for differential corrections, an information element for navigation model, an information element for real time integrity, an information element for data bit assistance, an information element for acquisition assistance, an information element for almanac, an information element for a UTC model, etc. The navigation models may be different for different GNSS. Each navigation model includes a respective satellite identifier "svID", a clock model and an orbit model in the form of ephemeris data. The orbit model for BDS includes fields defining Keplerian parameters "NavModel-BDS-KeplerianSet" as ephemeris data. The fields include a field "bdsToe" representing the parameter $t_{oe}$ as ephemeris reference time (in seconds).

The generic assistance data includes for BDS as well IE "BDS-IonosphericModels" that is used by location server 510 to provide BDS-satellite specific ionospheric models from the "Fundamental NAV information" in the BDS satellite signals to a respective target device, like mobile device 500. The BDS ionospheric models are referenced to BDS navigation models by means of a satellite identifier "svID" and by a time stamp "Toe". Each BDS-ionospheric model may comprise in addition by way of example the following fields:

The field "bdsToe" comprises an INTEGER (0 . . . 131071) and represents the parameter $t_{oe}$ as ephemeris reference time (in seconds). This parameter must have the same value as "bdsToe" "NavModel-BDS-KeplerianSet" for the same BDS satellite indicated by the satellite identifier "svID". The scale factor is $2^3$ seconds. The field "alfa0" comprises an INTEGER (−128 . . . 127) and specifies the $\alpha_0$ parameter of the Klobuchar model. The scale factor is $2^{-30}$ seconds. The field "alfa1" comprises an INTEGER (−128 . . . 127) and specifies the $\alpha_1$ parameter of the Klobuchar model. The scale factor is $2^{-27}$ seconds/semi-circle. The field "alfa2" comprises an INTEGER (−128 . . . 127) and specifies the $\alpha_2$ parameter of the Klobuchar model. The scale factor is $2^{-24}$ seconds/semi-circle$^2$. The field "alfa3" comprises an INTEGER (−128 . . . 127) and specifies the $\alpha_3$ parameter of the Klobuchar model. The scale factor is $2^{-24}$ seconds/semi-circle$^3$. The field "beta0" comprises an INTEGER (−128 . . . 127) and specifies the $\beta_0$ parameter of the Klobuchar model. The scale factor is $2^{11}$ seconds. The field "beta1" comprises an INTEGER (−128 . . . 127) and specifies the $\beta_1$ parameter of the Klobuchar model. The scale factor is $2^{14}$ seconds/semi-circle. The field "beta2" comprises an INTEGER (−128 . . . 127) and specifies the $\beta_2$ parameter of the Klobuchar model. The scale factor is $2^{16}$ seconds/semi-circle$^2$. The field "beta3" comprises an INTEGER (−128 . . . 127) and specifies the $\beta_3$ parameter of the Klobuchar model. The scale factor is $2^{16}$ seconds/semi-circle$^3$.

It has to be noted that BDS-satellite specific ionosphere models might only be included in the generic assistance data, for a respective BDS satellite if the BDS-satellite specific ionosphere model differs from the GNSS ionospheric model in the common assistance data.

Server 510 provides the assembled generic assistance data for transmission to mobile device 500 (action 613) and transmits the assistance data via interface 514, Internet 520 and network 530 to mobile device 500 (action 614).

Mobile device 500 receives the assistance data via transceiver 504 and determines its position using satellite signal measurements of action 601 and the received assistance data. (action 603)

The determination of the position comprises using BDS-satellite specific ionospheric models, if available, for correcting a propagation delay of signals of a respective specific BDS satellite. The ionospheric model that is used for a respective correction includes the same toe parameter as the ephemeris data that is used for computing a satellite position of the BDS satellite as a basis for determining be position of mobile device 510. The ephemeris data may be taken from the "Fundamental NAV information" section in received BDS satellite signals or from the received assistance data. If a BDS-satellite specific ionospheric model is not available for any of the considered BDS satellites, or if in addition satellite signals of any other GNSS than BDS are considered, the GNSS ionospheric model in the common assistance data, if provided, is used for correcting a propagation delay of the satellite signals.

Figure 7:
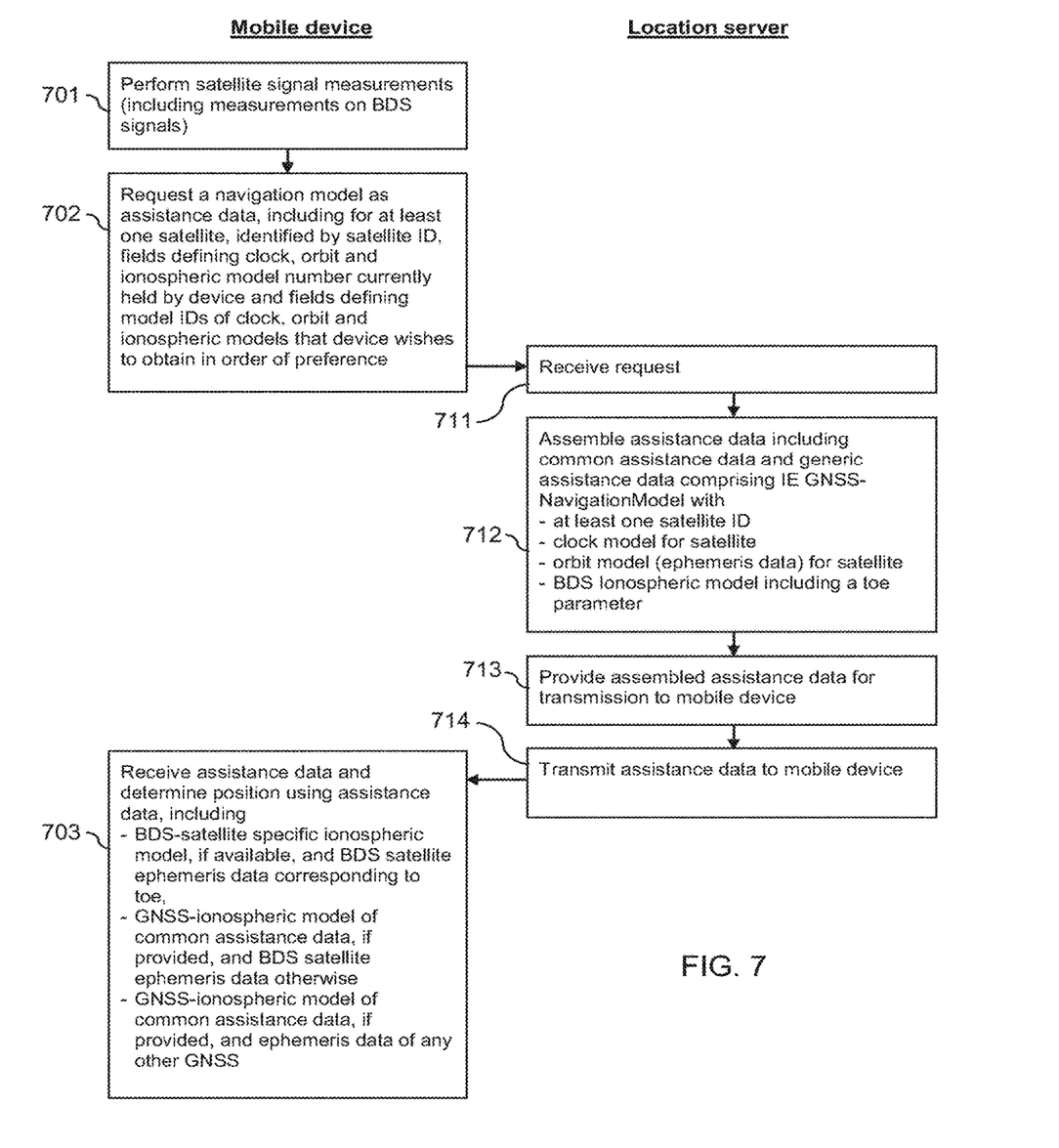
FIG. 7 is a flow chart illustrating a second example embodiment of an operation in the system of FIG. 5.

FIG. 7 is a flow chart illustrating a second, alternative implementation for supporting the use of BDS-satellite specific ionospheric models in assistance data.

Processor 501 and some of the program code stored in memory 502 causes mobile device 500 to perform the actions presented on the left hand side when the program code is retrieved from memory 502 and executed by processor 501. Processor 511 and some of the program code stored in memory 512 causes server 510 to perform the actions presented on the right hand side when the program code is retrieved from memory 512 and executed by processor 511.

When the position of mobile device 500 is to be determined, for instance in response to a user request or upon initiation of some application running in mobile device 500, mobile device 500 performs satellite signal measurements using GNSS receiver 506, including measurements on BDS satellite signals. (action 701)

In addition, mobile device 500 requests assistance data for one or more GNSSs, including BDS, from server 510. (action 702) The specific GNSS for which the assistance data is requested may be indicated by an IE "GNSS-ID" and possibly an IE "SBAS-ID" in an IE "GNSS-GenericAssistDataReq" of the GNSS assistance data request. The request comprises in this "GNSS-GenericAssistDataReq" a field "GNSS-NavigationModelReq" for requesting satellite specific navigation model data for satellites of the identified GNSS. The request may include for each satellite, identified by a satellite identifier "svID", the field "ionoModelID" which defines the ionospheric model number currently held by the target device. The request may include for each satellite, identified by a satellite identifier "svID", the field "ionoModelID-PrefList", which defines the ionospheric models that a target devices wishes to obtain in the order of preference.

Server 510 receives the request. (action 711)

Server 510 assembles thereupon GNSS assistance data, including common assistance data comprising an IE "GNSS-IonosphereModel" as a common ionosphere model, and generic assistance data for specific GNSSs. (action 712) The data for a specific GNSS, identified by an IE "GNSS-ID", may include different kinds of information elements, for instance an information element for time models, an information element for differential corrections, an information element for navigation model, an information element for real time integrity, an information element for data bit assistance, an information element for acquisition assistance, an information element for almanac, an information element for a UTC model, etc.

The IE "GNSS-NavigationModel" for a navigation model is used by the location server 510 to provide precise navigation data to the target device. The IE "GNSS-NavigationModel" includes an IE "svID" for a satellite identifier, an IE "GNSS-ClockModel" for a clock model, an IE "GNSS-OrbitModel" for an orbit model in the form of ephemeris parameters, and optionally an IE "GNSS-IonoModel", which may be selected for BDS to be an IE "bsd-IonoModel". The IE "bsd-IonoModel" is used by location server 510 to provide BDS-satellite specific ionospheric model to a BDS capable target device, like mobile device 500.

The IE "bsd-IonoModel" may include fields "bdsToe", "alfa0", "alfa1", "alfa2", "alfa3", "beta0", "beta1", "beta2" and "beta3" as defined above.

Server 510 provides the assembled generic assistance data for transmission to mobile device 500 (action 713) and transmits the assistance data via interface 514, Internet 520 and network 530 to mobile device 500 (action 714).

Mobile device 500 receives the assistance data and determines its position using satellite signal measurements of action 701 and the received assistance data, similarly as described with reference to action 603 of FIG. 6. (action 703) A difference consists in that the BDS-satellite specific ionospheric models and the associated satellite identifiers, as far as available, are extracted in this case from the IE "GNSS-NavigationModel", instead of from a separate IE in the generic assistance data.

It is to be understood that the presented example system as well as the presented example operations may be varied in many ways. The operations may be varied for instance as well by omitting actions as by adding actions. In addition, the order of actions could be modified.

Summarized, certain embodiments of the invention may have the effect that the compatibility of the use of assistance data that may be provided for a BDS satellite signal based positioning with the use of broadcast BDS satellite signals is improved.

It is to be understood, though, that while a possible advantage has been presented with respect to BDS, the same approach could be used for any other satellite system, including present—optionally modified—systems as well as future systems.

It is further to be understood that while the presented assistance data could be provided to mobile devices using cellular communications following cellular standards, it could also be provided to mobile devices using other communication means, Any presented connection in the described embodiments is to be understood in a way that the involved components are operationally coupled. Thus, the connections can be direct or indirect with any number or combination of intervening elements, and there may be merely a functional relationship between the components.

Further, as used in this text, the term 'circuitry' refers to any of the following:
(a) hardware-only circuit implementations (such as implementations in only analog and/or digital circuitry)
(b) combinations of circuits and software (and/or firmware), such as: (i) to a combination of processor(s) or (ii) to portions of processor(s)/software (including digital signal processor(s)), software, and memory(ies) that work together to cause an apparatus, such as a mobile phone, to perform various functions) and (c) to circuits, such as a microprocessor(s) or a portion of a microprocessor(s), that require software or firmware for operation, even if the software or firmware is not physically present.

This definition of 'circuitry' applies to all uses of this term in this text, including in any claims. As a further example, as used in this text, the term 'circuitry' also covers an implementation of merely a processor (or multiple processors) or portion of a processor and its (or their) accompanying software and/or firmware. The term 'circuitry' also covers, for example, a baseband integrated circuit or applications processor integrated circuit for a mobile phone.

Any of the processors mentioned in this text could be a processor of any suitable type. Any processor may comprise but is not limited to one or more microprocessors, one or more processors) with accompanying digital signal processor(s), one or more processor(s) without accompanying digital signal processor(s), one or more special-purpose computer chips, one or more field-programmable gate arrays (FPGAS), one or more controllers, one or more application-specific integrated circuits (ASICS), or one or more computer(s). The relevant structure/hardware has been programmed in such a way to carry out the described function.

Any of the memories mentioned in this text could be implemented as a single memory or as a combination of a plurality of distinct memories, and may comprise for example a read-only memory (ROM), a random access memory (RAM), a flash memory or a hard disc drive memory etc.

Moreover, any of the actions described or illustrated herein may be implemented using executable instructions in a general-purpose or special-purpose processor and stored on a computer-readable storage medium (e.g., disk, memory, or the like) to be executed by such a processor. References to 'computer-readable storage medium' should be understood to encompass specialized circuits such as FPGAs, ASICs, signal processing devices, and other devices.

Figure 8:
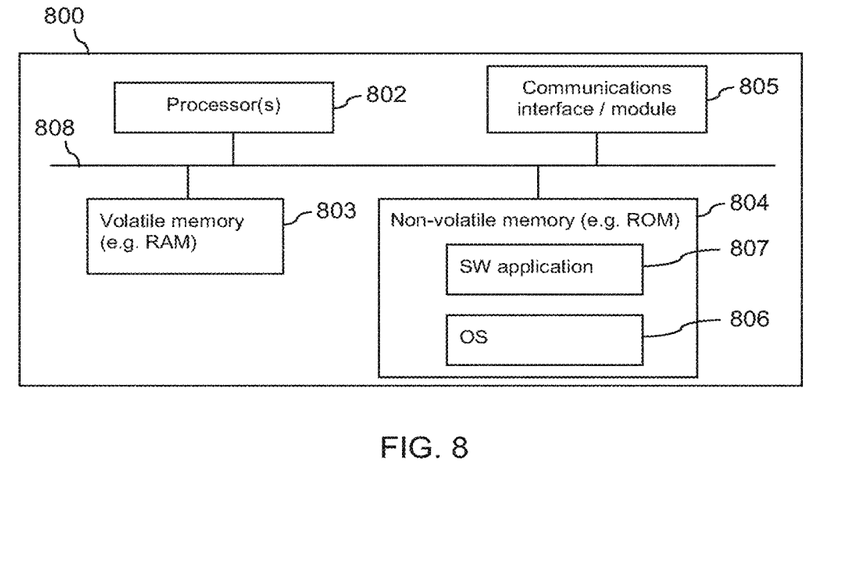
FIG. 8 is a schematic block diagram of an example embodiment of an apparatus.
Figure 9:
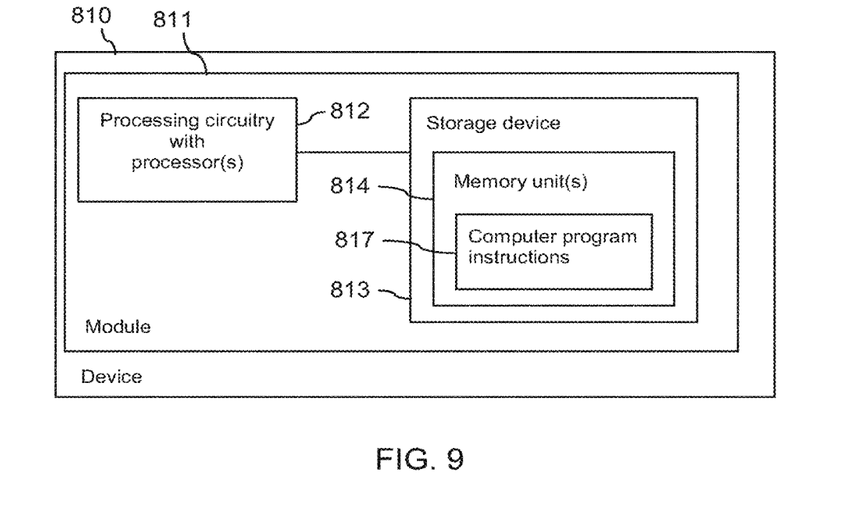
FIG. 9 is a schematic block diagram of an example embodiment of an apparatus.

Example embodiments using at least one processor and at least one memory as a non-transitory data medium are shown in FIGS. 8 and 9.

FIG. 8 is a schematic block diagram of a device 800. Device 800 includes a processor 802. Processor 802 is connected to a volatile memory 803, such as a RAM, by a bus 808. Bus 808 also connects processor 802 and RAM 803 to a non-volatile memory 804, such as a ROM. A communications interface or module 805 is coupled to bus 808, and thus also to processor 802 and memories 803, 804. Within ROM 804 is stored a software (SW) application 807. Software application 807 may be a positioning application, although it may take some other form as well. An operating system (OS) 806 also is stored in ROM 804.

FIG. 9 is a schematic block diagram of a device 810. Device 810 may take any suitable form. Generally speaking, device 810 may comprise processing circuitry 812, including one or more processors, and a storage device 813 comprising a single memory unit or a plurality of memory units 814. Storage device 813 may store computer program instructions 817 that, when loaded into processing circuitry 812, control the operation of device 810. Generally speaking, also a module 811 of device 810 may comprise processing circuitry 812, including one or more processors, and storage device 813 comprising a single memory unit or a plurality of memory units 814. Storage device 813 may store computer program instructions 817 that, when loaded into processing circuitry 812, control the operation of module 811.

The software application 807 of FIG. 8 and the computer program instructions 817 of FIG. 9, respectively, may correspond e.g. to the computer program code in any of memories 102, 302, 502 or 512, respectively.

Figure 10:
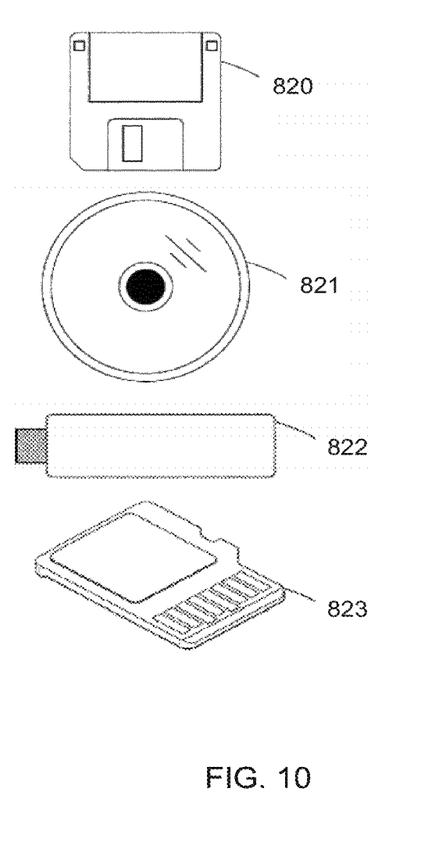
FIG. 10 schematically illustrates example removable storage devices.

In example embodiments, any non-transitory computer readable medium mentioned in this text could also be a removable/portable storage or a part of a removable/portable storage instead of an integrated storage. Example embodiments of such a removable storage are illustrated in FIG. 10, which presents, from top to bottom, schematic diagrams of a magnetic disc storage 820, of an optical disc storage 821, of a semiconductor memory circuit device storage 822 and of a Micro-SD semiconductor memory card storage 823.

The functions illustrated by processor 101 in combination with memory 102, or processor 511 in combination with memory 512, or the integrated circuit 513 can also be viewed as means for assembling assistance data for a satellite signal based positioning of a device, the assistance data comprising a satellite specific ionospheric model for at least one specific satellite and a time stamp that relates the satellite specific ionospheric model to particular ephemeris data for the at least one specific satellite; and means for providing the assistance a for transmission.

The program codes in memories 102 and 512 can also be viewed as comprising such means in the form of functional modules.

The functions illustrated by processor 301 in combination with memory 302, or processor 501 in combination with memory 502, or the integrated circuit 503 can also be viewed as means for receiving assistance data for a satellite signal based positioning of a device, the assistance data comprising a satellite specific ionospheric model for at least one satellite and a time stamp that relates the satellite specific ionospheric model to particular ephemeris data for the at least one specific satellite; and means for computing a position of the device making use of the particular ephemeris data and of the satellite specific ionospheric model.

The program codes in memories 302 and 502 can also be viewed as comprising such means in the form of functional modules.

FIGS. 2, 4, 6 and 7 may also be understood to represent example functional blocks of computer program codes supporting a coverage area modeling.

It will be understood that all presented embodiments are only examples, and that any feature presented for a particular example embodiment may be used with any aspect of the invention on its own or in combination with any feature presented for the same or another particular example embodiment and/or in combination with any other feature not mentioned. It will further be understood that any feature presented for an example embodiment in a particular category may also be used in a corresponding manner in an example embodiment of any other category.

I claim:

1. A method performed by at least one apparatus, the method comprising:
receiving assistance data for a satellite signal based positioning of a device, the assistance data comprising a satellite specific ionospheric model for at least one satellite and a time stamp that relates the satellite specific ionospheric model to particular ephemeris data for the at least one specific satellite; and computing a position of the device making use of the particular ephemeris data and of the satellite specific ionospheric model.

2. The method according to claim 1, wherein the at least one specific satellite is a satellite of a BeiDou navigation satellite system.

3. An apparatus comprising at least one processor and at least one memory including computer program code, the at least one memory and the computer program code configured to, with the at least one processor, cause the apparatus at least to perform:
receive assistance data for a satellite signal based positioning of a device, the assistance data comprising a satellite specific ionospheric model for at least one satellite and a time stamp that relates the satellite specific ionospheric model to particular ephemeris data for the at least one specific satellite; and
compute a position of the device making use of the particular ephemeris data and of the satellite specific ionospheric model.

4. The apparatus according to claim 3, wherein the at least one specific satellite is a satellite of the BeiDou navigation satellite system.

5. The apparatus according to claim 3, wherein the at least one memory and the computer program code are configured to, with the at least one processor, cause the apparatus to at least one of:
receive satellite signal;
receive satellite signal measurements;
assemble a request for the assistance data;
assemble a request for the assistance data, the request including a request for assistance data for a BeiDou navigation satellite system and a request for satellite specific ionospheric models for BeiDou navigation satellite system satellites;
assemble a request for the assistance data, the request including a request for a satellite specific ionospheric model for at least one particular satellite;
assemble a request for the assistance data, the request including at least one time stamp for available ephemeris data for at least one particular satellite;
cause transmission of a request for the assistance data to a server; or
transmit a request for the assistance data to a server.

6. The apparatus according to claim 3, wherein the at least one memory and the computer program code are configured to, with the at least one processor, cause the apparatus to:
assemble a message with data informing a server about assistance data types supported by the device, the message including information that the device supports use of satellite specific ionospheric models of a particular global navigation satellite system; and
cause transmission of the message to a server.

7. The apparatus according to claim 3, wherein the apparatus is one of:
a chip;
a module for a mobile device;
a mobile device;
a mobile device comprising a receiver for satellite signal of a global navigation satellite system;
a mobile device comprising a receiver for satellite signals of a BeiDou navigation satellite system; and
a mobile communication device.

8. A non-transitory computer readable storage medium in which computer program code is stored, the computer program code causing an apparatus perform the following when executed by a processor:
receive assistance data for a satellite signal based positioning of a device, the assistance data comprising a satellite specific ionospheric model for at least one satellite and a time stamp that relates the satellite specific ionospheric model to particular ephemeris data for the at least one specific satellite; and
compute a position of the device making use of the particular ephemeris data and of the satellite specific ionospheric model.

\* \* \* \* \*